May 18, 1948.    C. DOERING ET AL    2,441,757
APPARATUS FOR CUTTING AND IMPRESSING SUBSTANCES
Filed July 13, 1942    7 Sheets-Sheet 2
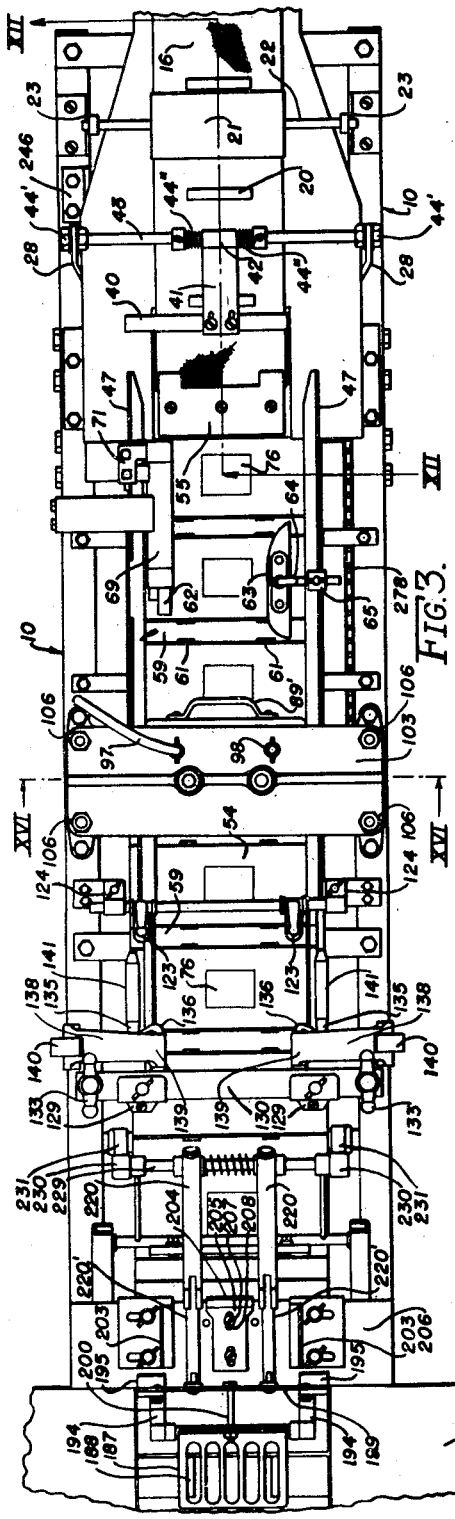
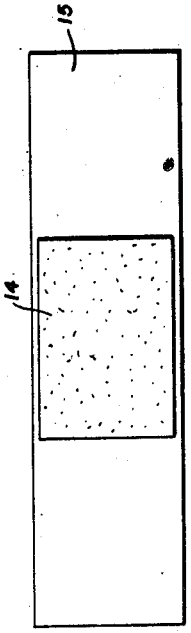
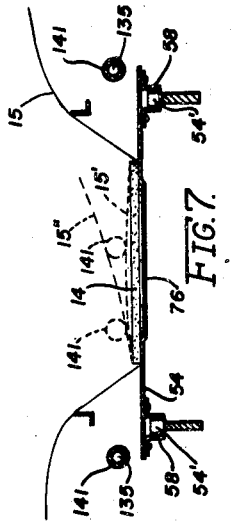
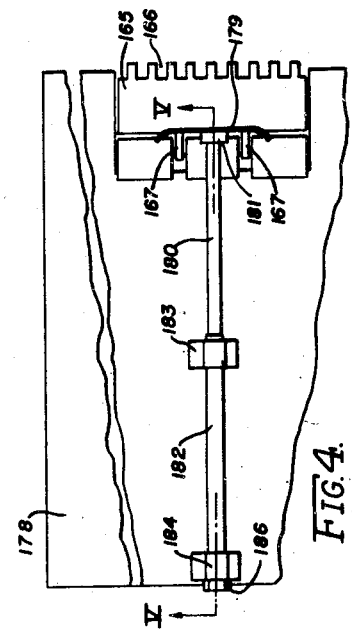
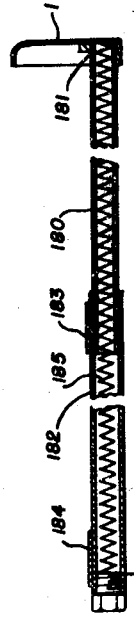
INVENTORS.
CHARLES DOERING.
HENRY H. DOERING.
BERTIL J. SKOGLUND.
ERIC W. ANDERSON.
BY
ATTORNEY.

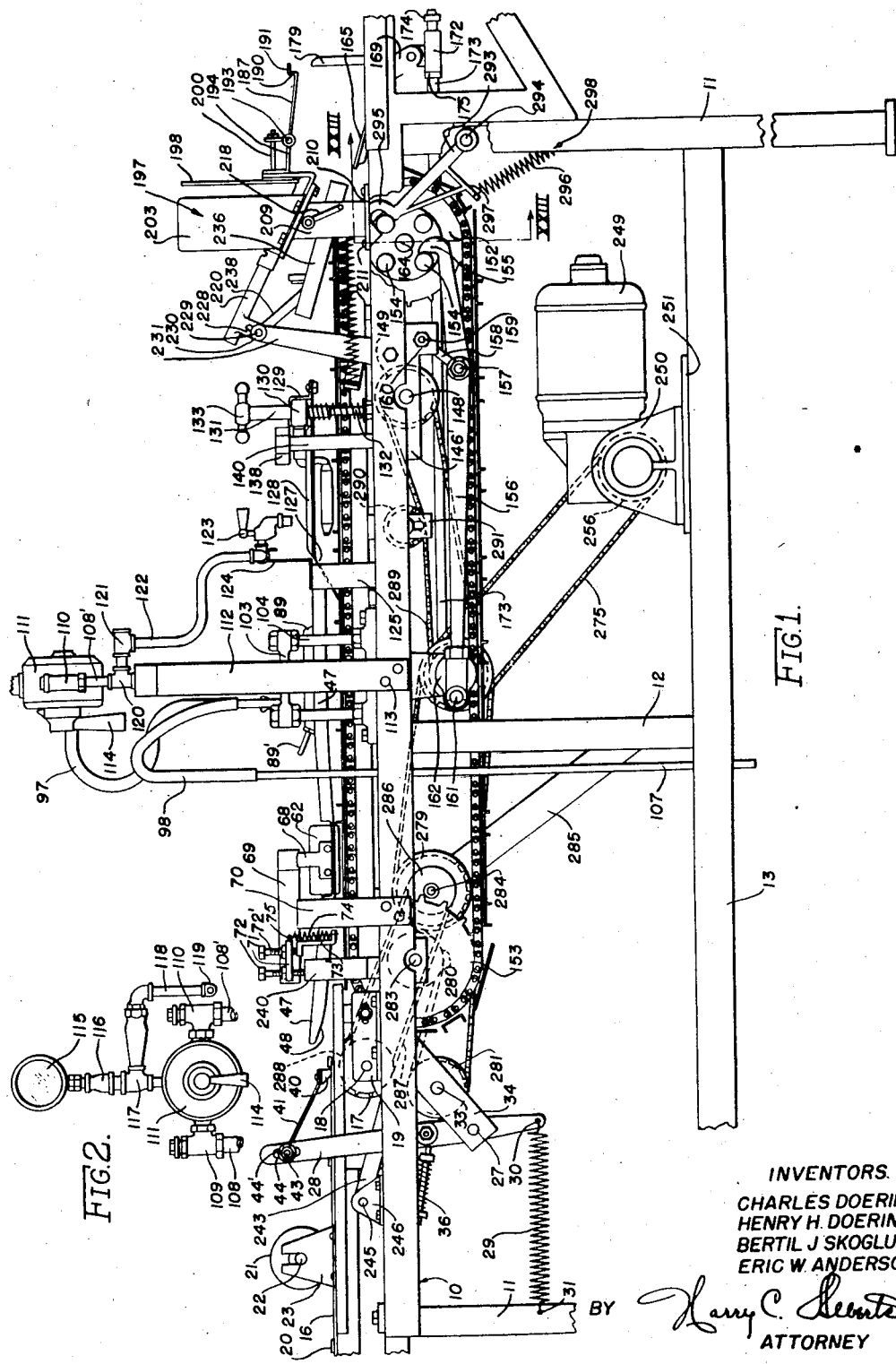

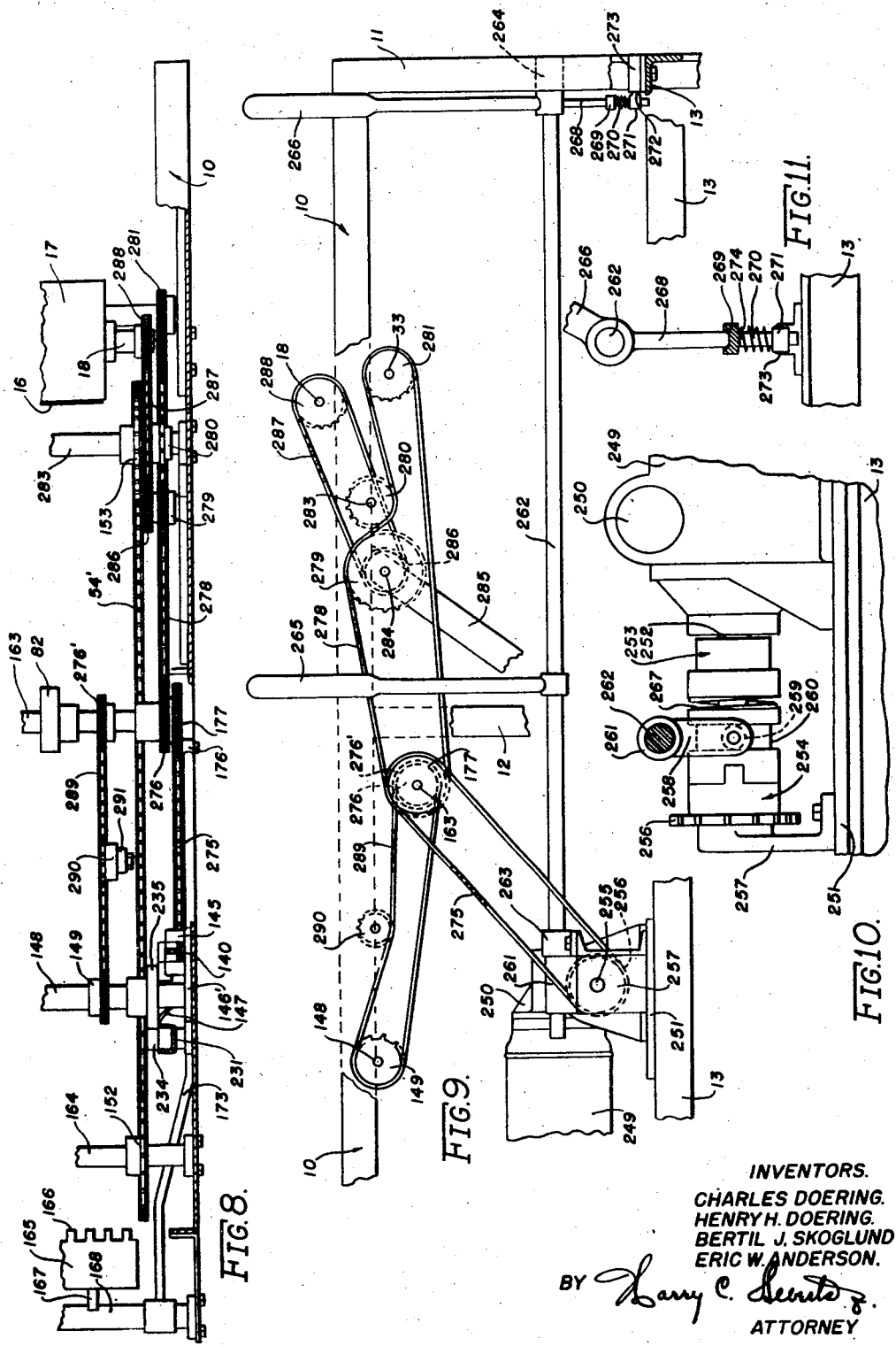

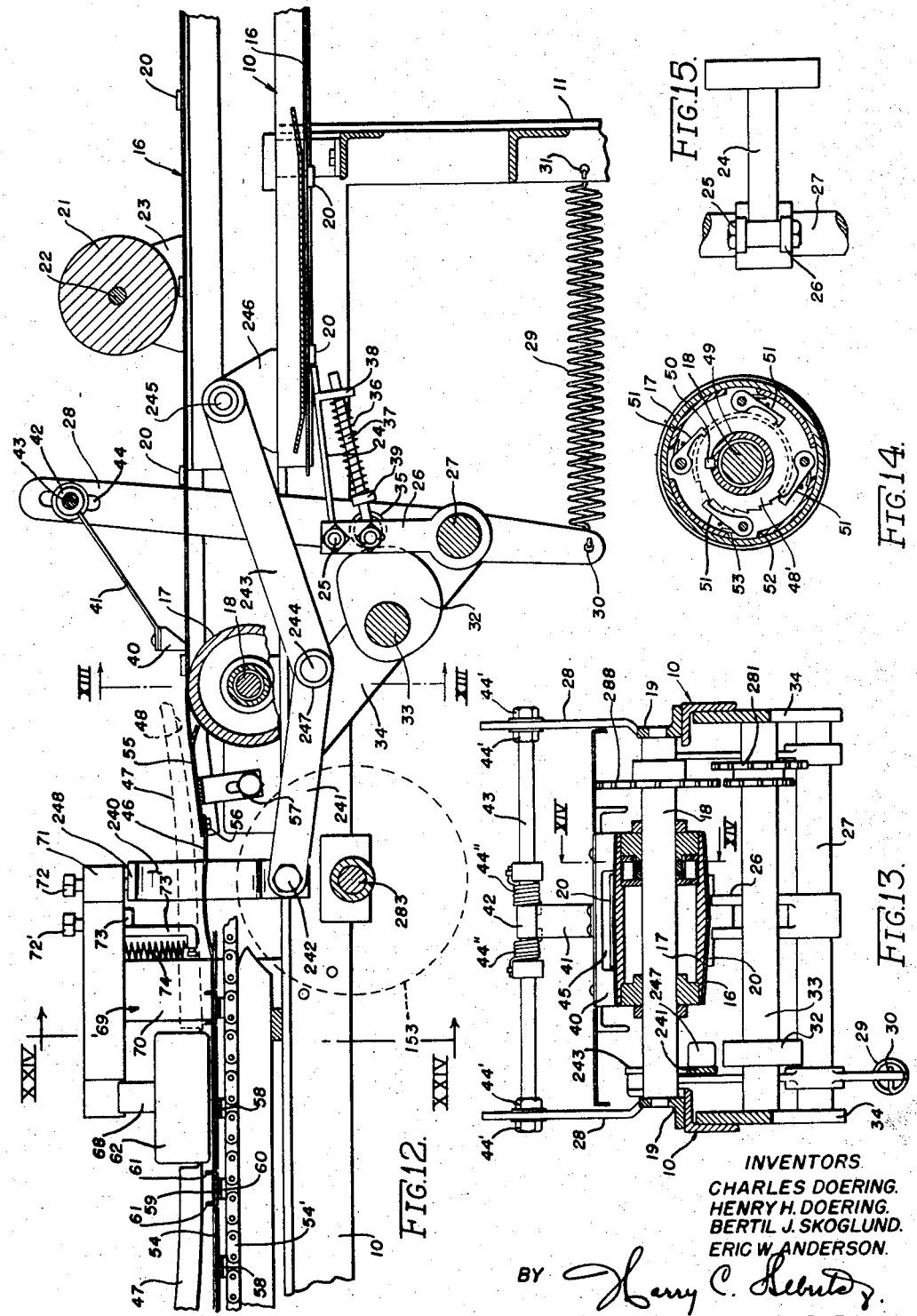

INVENTORS.
CHARLES DOERING.
HENRY H. DOERING.
BERTIL J. SKOGLUND.
ERIC W. ANDERSON.
BY Harry C. Lunts
ATTORNEY.

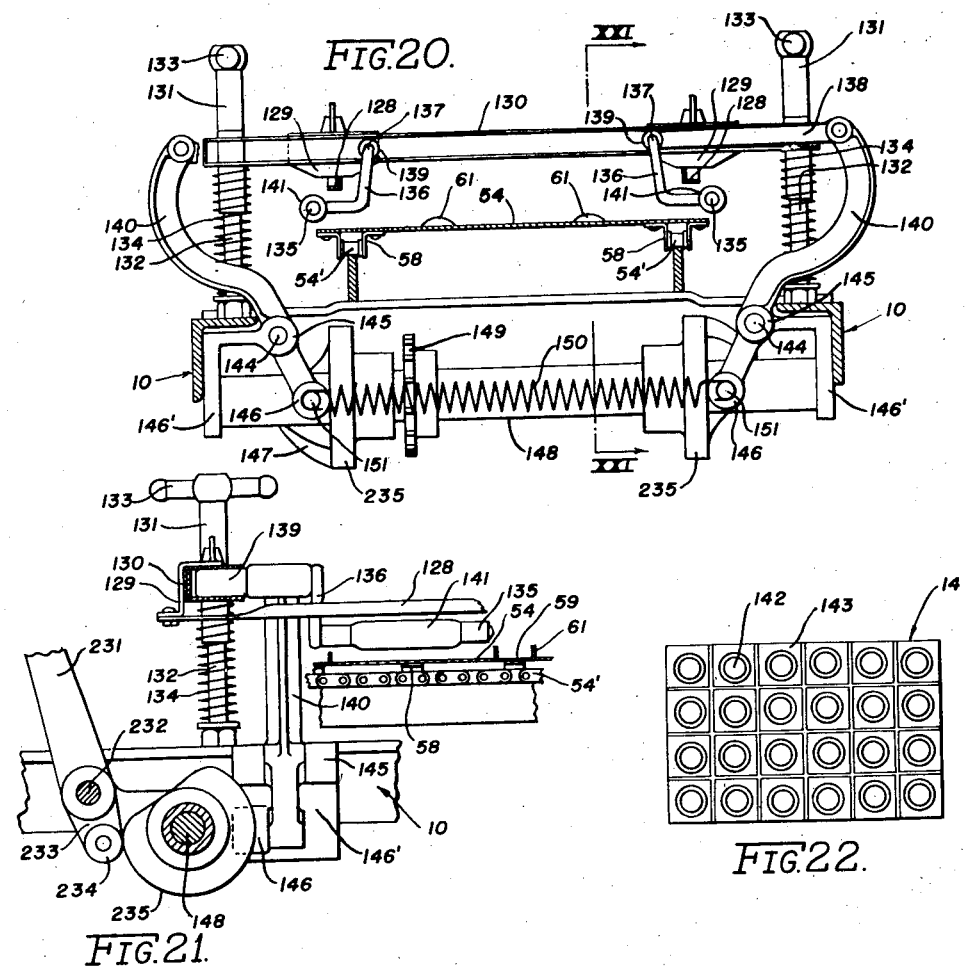
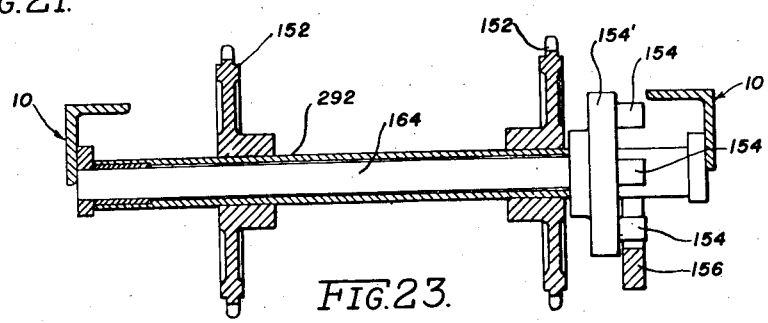

May 18, 1948. C. DOERING ET AL 2,441,757
APPARATUS FOR CUTTING AND IMPRESSING SUBSTANCES
Filed July 13, 1942 7 Sheets-Sheet 7
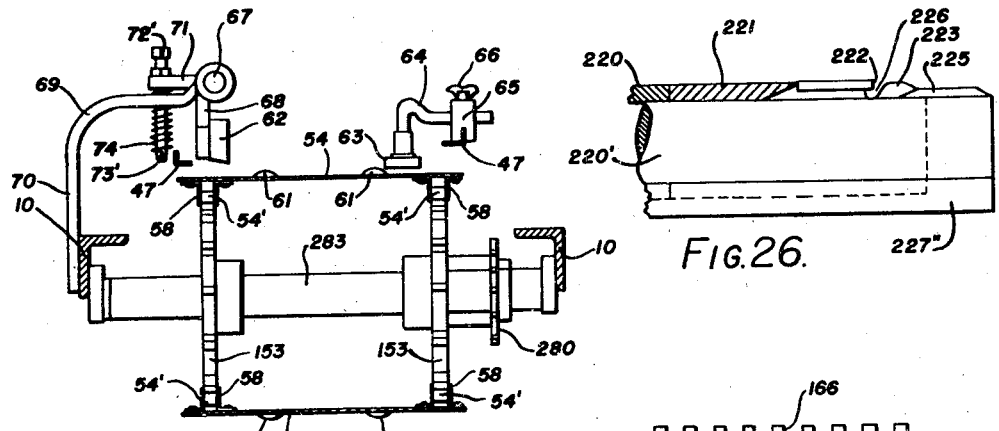
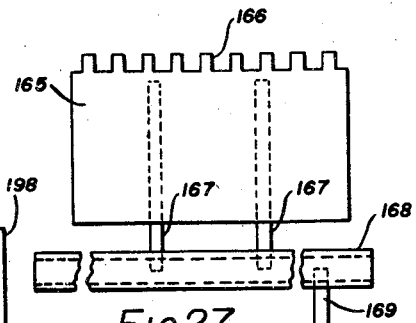
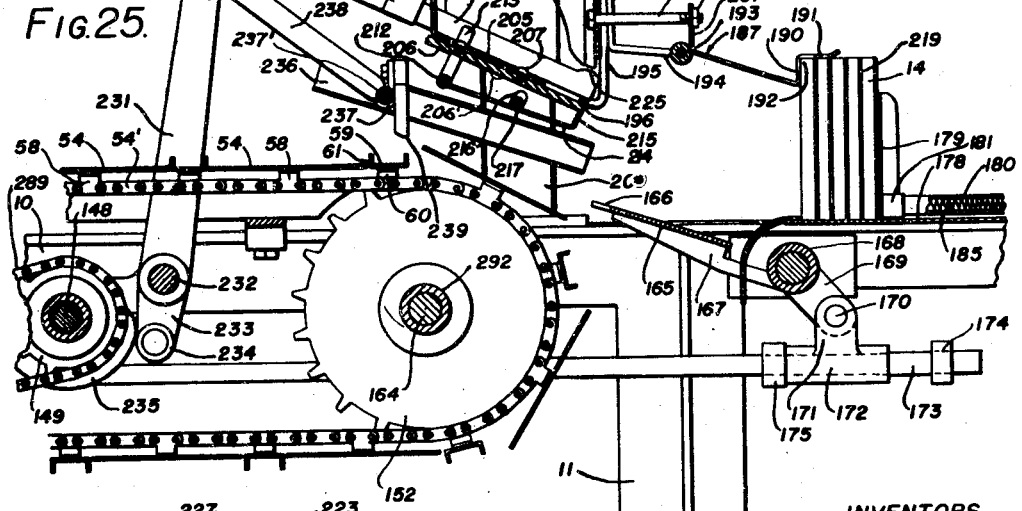
INVENTORS.
CHARLES DOERING.
HENRY H. DOERING.
BERTIL J. SKOGLUND.
ERIC W. ANDERSON.
ATTORNEY.

Patented May 18, 1948

2,441,757

UNITED STATES PATENT OFFICE 2,441,757

APPARATUS FOR CUTTING AND IMPRESSING SUBSTANCES

Charles Doering, Henry H. Doering, Eric W. Anderson, and Bertil J. Skoglund, Chicago, Ill.; said Anderson and said Skoglund assignors to said Charles Doering and said Henry H. Doering Application July 13, 1942, Serial No. 450,769

15 Claims. (Cl. 31—20)

This invention relates to combined cutting and impressing devices for converting edible plastic slabs into segmented and impressed units of varied or any desired surface design, although certain features thereof may be employed with equal advantage for other purposes.

It contemplates more especially the provision of cutting and impressing instrumentalities combined to convert edible plastics into polygonal units in a single operation constituting automatically repeated continuous operations.

It has been customary to form edible plastics such as butter and kindred edible substances into rectangular bricks of varying weights; however, these necessitated transverse and longitudinal severance with auxiliary devices to create rectangular segments primarily for restaurant purposes. This not only entails much labor in the preparation thereof for serving to the consumer, but also the contour thereof is only utilitarian and does not enhance the appearance thereof, an important factor in pleasing the taste of the individual consumer.

The novel formation of edible plastics into adhering units of varied design imparts a continuous polygonal effect, serves to impart a more pleasant appearance thereto, and also eliminates considerable labor heretofore necessary in producing palatable segments thereof. Edible plastics produced in accordance with the teachings of the present invention require a single operating stroke severance and surface design formation, this being distinguished from the usual method of longitudinal and then transverse division of bricks into multiple segments of usual rectangular shape without any possible surface design that is not altogether advantageous for restaurant purposes.

Power operation of converging means serves to feed slabs of substance in the path of the impressing and cutting instrumentalities to render the latter effective to convert the slabs into design impressed multiple segments or units in a continuity of operations without manual intervention. This may be in the form of suitable automatic controls depending upon the dictates of commercial practice. It is important that the power instrumentalities that actuate the cutting and impressing instrumentalities, be controlled to the extent of creating a single actuation for each slab of material that is presented thereto. This is controlled automatically to avoid a duplication of impressions and to insure precision as well as a maximum production by the improved combination of elements that makes possible the simultaneous power actuation of impressing, cutting and synchronized feeding instrumentalities in devices of this character.

One object of the present invention is to simplify the construction and improve the operation of devices of the character mentioned.

Another object is to provide a simple, effective, and continuous operating machine to effect the formation of edible plastic slabs into a plurality of multiple segments of any selected surface design to render such more palatable and attractive.

Still another object is to provide an improved combination of elements that automatically feeds, impresses, and severs plastic slabs into a plurality of segmented units to the desired shape and appearance.

A further object is to provide an improved combination of feeding, segmenting, surface impressing, and discharging instrumentalities automatically operative in synchronized timed relation for the conversion of edible plastic slabs into multiple segments impressed with selected surface designs thereof.

A still further object is to provide a novel combination of feeding, impressing, cutting, wrapping and discharging instrumentalities in a continuously operating automatic machine.

Still a further object is to provide a novel combination of feeding, impressing, cutting, and ejecting instrumentalities in combination with thermal control means to continuously convert edible plastic slabs into multiple segments without human intervention.

Other objects and advantages will appear from the following description of an illustrative embodiment of the present invention.

In the drawings:

Figure 1 is a side view in elevation of a device embodying teachings of the present invention.

Figure 2 is a fragmentary front view in elevation of a mixing valve and gauge constituting the thermal medium control.

Figure 3 is a plan view of the machine shown in Figure 1, parts thereof being broken away to enable an enlarged showing.

Figure 4 is a fragmentary plan view of the stacker instrumentalities.

Figure 5 is a sectional view in elevation taken substantially along line V—V of Figure 4.

Figure 6 is a plan view of a slab disposed on the sheet of paper serving as a supporting medium therefor.

Figure 7 is a diagrammatic sectional view in elevation showing the folding operation of applying the paper over the slab that has been impressed and segmented.

Figure 8 is a plan view showing the chain drivers serving to operate all of the instrumentalities from the common source of power.

Figure 9 is a side view in elevation of the chain drivers and their controls.

Figure 10 is a side view in elevation of the drive clutch interposed between the source of power and the operating instrumentalities.

Figure 11 is an enlarged detail of the locking device for the control handle shown in Figure 9.

Figure 12 is an enlarged fragmentary sectional side view in elevation showing the cam arrangement and belt adjusting instrumentalities taken substantially along line XII—XII of Figure 3.

Figure 13 is a sectional view in elevation taken substantially along line XIII—XIII of Figure 12.

Figure 14 is a sectional view in elevation taken substantially along line XIV—XIV of Figure 13.

Figure 15 is a plan view of the feeding belt synchronizing lever.

Figure 20 is a sectional view in elevation of the folding apparatus.

Figure 21 is a sectional view in elevation taken substantially along line XXI—XXI of Figure 20.

Figure 22 is a plan view of a sample segmented slab converted into a plurality of individual surface impressed units.

Figure 23 is an enlarged sectional view taken substantially along line XXIII—XXIII of Figure 1.

Figure 24 is a sectional view in elevation taken substantially along line XXIV—XXIV of Figure 12 showing the centering instrumentality.

Figure 25 is a fragmentary side sectional view in elevation of the stacking instrumentalities after the slabs have been impressed and segmented.

Figure 26 is a sectional view in elevation of the sheet feeding plunger.

Figure 27 is a plan view of the stacking plate.

Figure 28 is a sectional view in elevation taken through the card feeding plunger guide.

Figure 16:
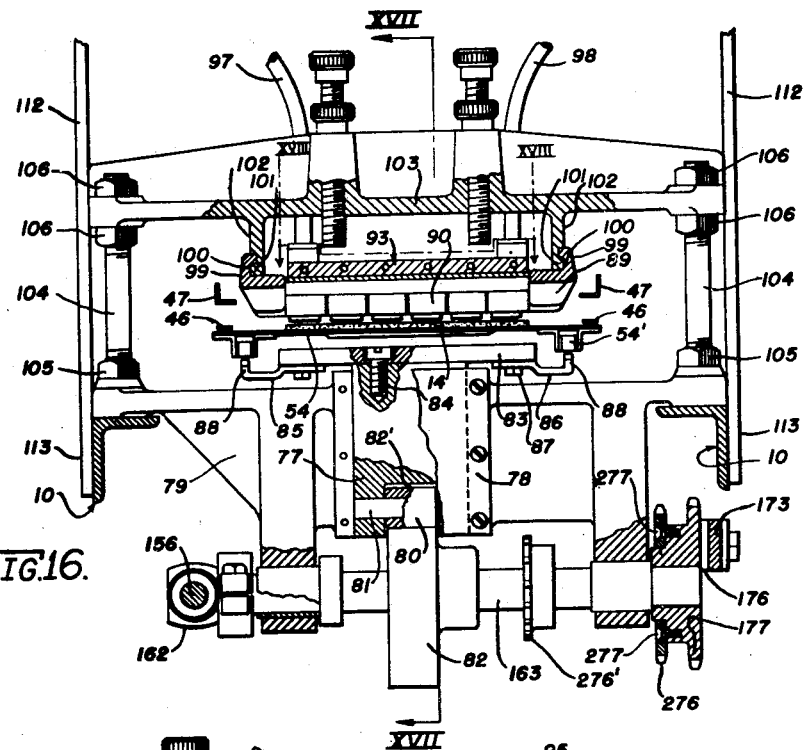
Figure 16 is an enlarged sectional view in elevation taken substantially along line XVI—XVI of Figure 3.

The structure selected for illustration comprises a horizontal frame member 10 of substantially rectangular configuration which is supported at the desired elevation by a plurality of corner standards 11, preferably though not essentially, comprising angle irons attached at the upper ends to the frame member 10 by welding, riveting, or other suitable fastening expedients. Intermediate vertical braces 12 depend from the frame member 10 to horizontal braces 13 that extend between the corner standards 11 to reinforce the frame 10 against vibration and creeping.

A plurality of plastic slabs 14 are superposed in vertical stacked relation with intermediate sheets 15 preparatory to processing with the instrumentalities which will be hereinafter described. The superposed slabs 14 are readily formed in any suitable manner as commercial practice may dictate. One method of forming superposed slabs is fully illustrated in copending application, Serial Number 269,297, filed April 21, 1939 which eventuated into Letters Patent No. 2,321,188, dated June 8, 1943. The individual slabs 14 each with a supporting paper sheet 15 are manually placed on an endless conveyor belt 16 which extends over horizontally disposed drums 17 journalled on shafts 18 supported on the frame 10 (Figure 1). To this end, the shafts 18 are mounted in brackets 19 fixed to the top edges of the frame 10 to horizontally support the conveyor belt 16 which is provided with uniformly spaced transverse cleats 20.

The cleats 20 are spaced to receive the individual slabs 14 and paper sheet 15 therebetween, and an idler roller 21 is journalled for rotary support thereover on a shaft 22 to render the slabs 14 flat and remove any depressions therein preparatory to cutting and impressing. The shaft 22 is supported between brackets 23 that maintains the idler roller 21 in superposed endless relation with the conveyor belt 16 so that the upper surface of the conveyor supported slab 14 will just pass beneath the peripheral surface of the roller 21 to insure the desired and uniform thickness of each slab preparatory to being severed and impressed with a surface design in a manner to be more fully described hereinafter.

The endless conveyor belt 16 has a linear speed that is somewhat slower than the conveyor drums 17 so that a booster mechanism comprising an arm 24 is mounted as at 25 to an oscillating arm 26 mounted on a stub shaft 27. The stub shaft 27 has fixed thereto a pair of spaced levers 28 disposed on both sides of the belt 16, which are normally urged in a counter-clockwise direction (viewed in Figure 12) by means of a spring 29. The spring 29 is anchored at one extremity as at 30 to the bottom of one of the levers 28 and the other extremity 31 thereof is anchored to a standard 11 of the frame 10.

The levers 28 are oscillated by the shaft 27 responsive to a cam 32 mounted on the shaft 33 which is journaled in a bracket 34. Rotation is imparted to the stub shaft 33 through instrumentalities to be hereinafter described, but the rotation of the cam 32 imparts an oscillatory movement to the booster arm 24 that is displaced in the path of the cleats 20 as such are disposed on the underside of the conveyor belt 16 in the traverse thereof around the drums 17.

The booster arm 24 with its lever is fixed to the shaft 27 and the arm 26 has a cam follower 35 mounted thereon in the path of the cam 32.

The booster or index arm 24 is held in contact with the conveyor belt 16 by means of the spring 36 that is disposed around a rod 37 which projects through a depending member 38 formed on the booster arm 24. The spring 36 is disposed on the rod 37 between the depending booster arm member 38 and the shoulder 39 provided on the rod 37. The spring 29 maintains the cam follower 35 in constant contact with the periphery of the cam 32 which in turn displaces the belt 16 through the booster arm 24 in the direction of its path of traverse to insure the proper positioning and indexing thereof relative to the feeding mechanism to be hereinafter described.

The feeding mechanism that is responsible for displacing the slabs 14 from the belt 16 to another conveying apparatus, consists of a feeder arm or block 40 attached to an inclined strap 41 terminating in a round extremity 42. The extremity 42 is journalled on a shaft 43 that is mounted in vertical slots 44 between the levers 28 (Figure 13). The slots 44 are provided in the upper end region of the levers 28. Oscillatory movement imparted to the levers 28 is responsible for corresponding movement of the feeder block 40 which has its lower extremity cut out as at 45 (Figure 13) to pass over the cleats 20 without obstruction thereto or influencing the movement of the belt 16 in consequence of the reciprocal movement of the feeding arm 40.

The feeding arm 40 in its forward movement in the direction of travel of the endless conveyor belt 16 displaces a slab 14 with its sheet 15 above runways 46 and beneath guides 47 that are correspondingly spaced and confront each other. The runways 46 and guides 47 are fixed along opposite sides of the conveyor belt 16 to define a path of travel for the slab 14 and its much wider supporting sheet 15.

The upper guides 47 are of rigid construction and are arcuately curved upwardly as at 48 (Figs. 1 and 12) to admit the sheet 15 thereunder with the slab 14 disposed therebetween. The lower guides or runways 46 are of resilient metallic construction which serve to confine and maintain the sheet 15 flat against the upper guides 47 to avoid curling or wrinkling until it arrives at a position beyond the impressing and cutting instrumentalities as will appear more fully hereinafter.

The shaft 43 is adjustably secured in the slots 44 by means of confronting fastener nuts 44', thereby enabling the feeder arm 40 to be vertically adjusted relative to the endless conveyor belt 16. The coil springs 44'' envelop the shaft 43 and engage the feeder arm strap 41 to normally urge the feeder block 40 in a counterclockwise direction (viewed from Figure 12) to establish contact behind the slab 14 in displacing it forward beyond the conveyor belt 16.

It should be noted that the forward conveyor roller 17 is ratchet-operated to intermittently advance the conveyor belt 16 in a direction so that its top surface travels toward the feeder block 40. Then, too, the conveyor belt 16 can be moved in the direction of its travel at a rate greater than the ratcheting operation provides, and this enables the booster arm 24 to advance the conveyor belt 16 so that the roller 17 rides over the ratchet. This is effected by the booster mechanism including the arm 24 which insures correct timing of the conveyor belt 16 with the operation of the feeder block 40 in the event these instrumentalities should not be in their proper synchronized relative position for successive feeding and transfer of the substance slabs 14. To this end, the roller shaft 18 carries a ratchet wheel 48' (Figure 14) that is secured to a tubular hub 49 through a keyway 50. A plurality of pawls 51, in this instance four, are pivotally mounted to a sleeve 52, and springs 53 exert a pivotal urge thereto in a clockwise direction (viewed from Figure 14) to maintain the pawls in operating engagement with the periphery of ratchet wheel 48'.

There are an odd number of teeth in the ratchet wheel 48' which cooperate with the even number of pawls 51 so that each movement of the ratchet wheel 48' will cause a successive pawl 51 to engage in a tooth thereof. This affords a short intermittent step without providing unnecessarily small teeth around the ratchet wheel 48', thereby gaining the advantage of a strong and durable ratchet wheel with fine short intermittent steps occasioned by the operation of the shaft 18 that is oscillated in a manner which will appear more fully hereinafter. By this arrangement, the top surface of the conveyor belt 16 can be moved forwardly in the direction of the roller 17 by either the booster arm 24 or manual displacement. The pawls 51 ride over the ratchet wheel 48'.

The feeder block 40 displaces the slab of plastic material such as butter 14 with its supporting paper sheet 15 onto a plate 54 through the medium of an apron 55 that is interposed between the forward end of the conveyor 16 and the resilient guides 46 that are anchored thereto as at 56 (Figure 12). A slotted bracket 57 serves to adjustably mount the apron 55 to assume the proper position as an intermediate supporting surface between the conveyor 16 and the guides 46.

The chain plates 54 are attached to brackets 58 disposed along a transverse median line thereof so that the lower bracket portions conforming with the links of the chains 54' can constitute an element or link portion thereof to carry the plates 54. Spacer strips 59 are interposed between the chain plates 54 for mounted attachment to the chains 54' through link brackets 60 (Figure 25).

It should be noted that the spacer strips 59 interposed between the chain plates 54 have upstanding nibs 61 along their edges to serve as stops for the plastic slabs 14 disposed on the adjacent chain plates 54. So that the plastic slabs 14 will be centered on the chain plates 54, they are initially deposited somewhat to one side thereof by reason of the somewhat laterally offset positioning of the conveyor belt 16 relative to the chain plates 54. This enables a centering device comprising, in this instance, an upstanding plate 62 to shift the plastic slab 14 with its paper sheet 15 toward the center. The upstanding plate 62 is mounted to move crosswise of the chain plate 54 (Figure 3) and this movement is constantly effected through the operation of a cam actuator toward an adjustably mounted stop 63 as will appear more fully hereinafter. The stop 63 is supported by an arm 64 that is adjustably attached to a boss 65. The stop 63 (Figure 24) is held in its adjusted position by a wing nut 66 to provide the proper positioning of the slab 14 by the centralizing member 62.

The centralizer 62 is pivotally mounted on a stud shaft 67 (Figure 24) through an arm 68. The stud shaft 67 is supported by a bracket 69 that is supported by a depending arm 70 attached to the frame 10. The centralizing arm 68 comprises part of a lever having an offset arm 71 through which an actuator depending screw or bolt 72 threadedly projects. Another threaded stud 72' extends therethrough to confront an offset 73 fixed to a bracket 69 and having a depending arm 73' to which a spring 74 is attached. The stud 72' serves as an adjustable stop for the slab centralizer 62. The other end of the spring 74 is anchored to the projection 75 of the arm 71 (Figure 1) to normally establish contact between the centralizing offset arm 71 through its threaded stud 72 and the cam actuator to be hereinafter described.

It should be noted that the central portion of each of the chain plates 54 is depressed as at 76 so that when the chain plate 54 is elevated against the die and pressure is applied to the slab 14, the central portion thereof is embossed downwardly to compensate for the movement of the severing blades therethrough and impart even impressions by the embossing dies thereon. The severing blades are arranged so that ordinarily the central region of the butter slab 14 is displaced further than the outside portions to compensate for the otherwise uneven impressions that would result throughout the surface extent of the slab 14. This is better understandable from the description of the cutting and impressing instrumentalities, which embody a piston 77 vertically reciprocable in a guide cylinder 78 (Figure 16) constituting part of a sub-frame 79 that is positioned between the confronting angles comprising part of the frame 10.

It should be observed that the piston 77 (Figures 16 and 17) has a roller 80 mounted on a stud shaft 81 positioned inwardly of a correspondingly shaped recess 82' that is somewhat larger than the roller 80. The roller 80 serves as a cam follower in confronting relation with a cam 82 mounted on the driving shaft 163 to raise and lower the piston 77 to which a plate 83 is attached. The plate 83 is attached to the piston 77 by virtue of threaded fasteners 84 so that the reciprocal movement of the plate 83 will correspond with the movement imparted to the piston 77 responsive to the cam 82.

It should be noted that the plate 83 carries arms 85—86 which are attached to the underside thereof as at 87 to serve as a complement of the links comprising part of the chains 54'. The plate arms 85—86 terminate in extremities 88 shaped as complements of the links of chains 54' to protrude therethrough and serve as an indexing mechanism so that the chain plates 54 will be accurately centered relative to the reciprocable piston 77 at its uppermost position of movement. The upper reciprocal movement of the piston 77 will cause the indexing arms 85—86 to protrude through the links of chains 54' and elevate the slab supporting chain plate 54 superposed thereover. This carries the index chain plate 54 with the slab 14 upwardly against a die-housing 89. In this upward movement of the chain plate 54, the lower resilient guides 46 move therewith to carry the slab 14 against a plurality of individual dies 90 fixed to the housing 89 with normally intersecting cutting blades 91 disposed therebetween. The normally intersecting blades 91 are attached to the housing 89 while the dies 90 are reciprocable relative thereto with the plate 92 which moves therewith.

The plate 92 is disposed above the cutter blades 91 so that the individual dies 90 can be raised or lowered with their mounting relative to the blades 91 depending upon the movement of the slab 14 with its supporting chain plate 54 in a vertically upward direction.

In order to control the temperature of the plastic slab 14 so that the dies 90 and cutting blades 91 can perform their impressing and severing operations with the desired degree of perfection, a heating plate 93 is disposed above the die-mounting plate 92 for contact therewith. To this end, the heating plate 93 is provided with a circuitous length of tubing 94 disposed therethrough to communicate with an inlet 95 and an outlet 96. The heating plate 93 is loosely supported by the die-mounting plate 92 without any connection therebetween. Temperature controlled water circulates throughout the circuitous tubing 94 in the heating plate 93 through the medium of flexible conduits 97 and 98 which connect with the inlet 95 and outlet 96.

The dies 90 with their cutting plates 91 may be removed as a unit with the housing 89 which has upstanding side arms 99. The side arms 99 are provided with side grooves 100 serving as complements of corresponding tongues 101 provided at the lower edges of depending plates 102. This enables the plate and die supporting housing 89 to be horizontally engaged and disengaged relative to the depending bracket plates 102 so that they can be readily attached or detached as well as interchanging depending upon the dictates of commercial practice. To this end, the die and cutter supporting housing 89 has a handle 89' (Figure 17) attached thereto to enable the convenient attachment and detachment thereof with the dies 90 and cutter blades 91 comprising elements thereof.

The depending plates 102 constitute a part of a bracket 103 which is superposed and vertically aligned with the piston confining bracket 79 through a plurality of rods 104 that are threadedly connected therebetween through any suitable fasteners such as nuts 105 and 106, the former engaging the studs 104 above the bracket 79 and the latter disposed on both sides of the upper bracket 103 for connection to the threaded portions of the rods 104.

The discharge flexible conduit 98 communicates with a vertically positioned pipe 107 (Figure 1) serving to conduct the discharge flow to a floor drain or for any other disposition that commercial practice may dictate. The hot and cold water supply pipes 108—108' are connected to T-unions 109—110 to communicate with and support a mixing chamber 111 on a substantially inverted U-shaped bracket 112. The side arms of the bracket 112 are attached to the frame 10 as at 113 to support the mixing chamber 111 above the impressing and cutting instrumentalities.

The mixing chamber 111 has a rotatably mounted valve handle 114 which controls the temperature of the water flowing through the flexible tube 97 to the heating plate 93. A temperature indicator such as a thermometer 115 is mounted through pipe connectors 116 to the mixing chamber 111 so that the water will be conducted thereto for temperature indication. A T 117 is disposed between the thermometer 115 and the mixing valve 111 to provide a branched pipe connection 118 that leads to a nipple 119 to which the flexible water supply tube 97 is attached.

It should be noted that the cold water supply pipe 108' has a T 120 provided therein between the mixing chamber 111 to provide a connection to a plugged T 121 which accommodates a flexible tube 122 communicating therewith. The flexible tube 122 terminates in an adjustable nozzle 123 that is mounted on a bracket 124 supported by the frame 10 through the medium of a strap member 125.

The nozzle 123 is disposed above the chain plates 54 beyond the impressing dies 90 and cutting blades 91 to compensate for the moisture lost during the impressing operation and to avoid drying of the paper sheet 15 supporting the plastic slab 14. This spray of cold water which is discharged by the nozzle 123 is positioned to provide the necessary moisture immediately after the impressing and cutting step and just prior to the folding of the paper around the plastic slab 14 which already has been impressed and severed into segments.

It should be noted that the strap member 125 also supports the terminal end of the upper paper guide 47 immediately in front of the paper folding instrumentalities which will be presently described. The flexible lower paper guides 46 terminate in upwardly inclined guide extensions 127 over which the end portions of the paper sheet 15 ride to commence the upper folding movement thereof. The upwardly inclined guide extensions 127 terminate in horizontal angle members 128 which are anchored at their free extremities to brackets 129 fixed to a crossbar 130. The crossbar 130 is adjustably supported by vertical tubular posts 131 which have threaded connection with smaller threaded posts 132 in actual line with their width to enable the raising and lowering of the crossbar 130 responsive to rotating the upper and somewhat larger posts 131 having a handle 133 fixed to their top extremity for that purpose. Coil springs 134 envelop the threadedly connected rods 131—132 beneath the crossbar 130 to maintain the elevated position of adjustment against axial relative rotation between the threadedly connected tubular rods 131—132.

Folder arms 135, in this instance two, have angularly offset and upwardly extending shanks 136 (Figure 20) which terminate in horizontal portions 137 parallel to the arms 135 for journalled support along the inward extremities of horizontally projecting bearing arms 138. The horizontal portions 137 of the folder arm shanks 136 terminate beyond the bearing arms 138 in rollers 139 that project latterly in and ride along the channel crossbar 130 serving as a guide for the horizontal transverse displacement of the folder arms 135 (Figure 20). The outward extremities of the bearing arms 138 are pivotally connected to a lever arm 140.

To this end, the bearing arms 138 can be pivotally adjusted to raise or lower the folding arms 135 by manipulating the handle members 133 that are operatively connected to the adjusting rods 131. This will enable folding of the sheet 15 over the slab 14 (Figure 7) irrespective of the thickness of the slab 14 should such be varied within the dictates of commercial practice. The folder arms 135 have resilient sleeves 141 disposed thereover to comprise a part thereof for movement in unison therewith transversely of the chain plates 54.

To overlap the ends of the slab supporting paper sheet 15, the folder arms 135 with their soft, yieldable sleeves 141, preferably though not essentially formed from rubber, move in toward each other with one positioned ahead of the other so that one fold 15' is first made over the slab 14 and thereafter the opposite edge portion 15" is folded to overlap the first fold 15'. The movement of one folding arm 135 ahead of the other permits this overlapping without one roller obstructing the other and effects the complete paper envelopment of the slab 14 after it has been ornamentally impressed as at 142 and severed into segments 143 (Figure 22).

In order to effect the inward time displacement of the folder arms 135 in advance of each other, the curved lever arms 140 are each pivoted intermediate the extremities thereof as at 144 to a boss 145 formed integral with an angular bracket 146' that is attached to the frame 10 to serve as a pivotal mount for the opposing lever arms 140. The lower extremities of the lever arms 140 beyond the shafts 144 have cam follower rollers 146 mounted thereon for positioning in the path of cams 147 fixed to the shaft 148. The shaft 148 is journalled for support in the brackets 146' for rotation responsive to a sprocket wheel 149 which is fixed thereto. In order that the cam follower rollers 146 will always be in engagement with the cams 147, a coil spring 150 has its extremities anchored to pins 151 which pivotally support the cam followers 146 on the lower extremities of the lever arms 140.

Consequently, the cam followers 146 will be spring urged toward each other to constantly engage the irregular cam surfaces 147 that are shaped to provide the proper movement and displacement to the lever arms 140 in advanced time relation relative to each other to effect horizontal inward and outward displacement of the folder arms 135. It should be noted that the moisture issuing out of the adjustable nozzle 123 for sprayed application to the slab 14 and paper sheet 15, sufficiently wets the folded paper extremities 15'—15" to effect the adhesion between the butter 14 and the folded protecting paper 15.

After the impressed and segmented slab 14 has been wrapped, it is ready to progress with the intermittent movement of the chain plates 54 for discharge without manual intervention.

The horizontally spaced endless chains 54' mesh with forward and rearward sprockets 152 and 153 that serve to effect linear movement thereof along an endless path having a straight linear upward travel somewhat above the frame 10 and below the endless conveyor belt 16. These serve to intermittently move the rigid chain plates 54 and their intermediate spacer strips 59 in a corresponding direction of travel of the conveyor belt 16 to momentarily halt the movement of each slab supporting plate 54 below the severing and impressing instrumentalities described supra.

Figures 17, 18, 19:
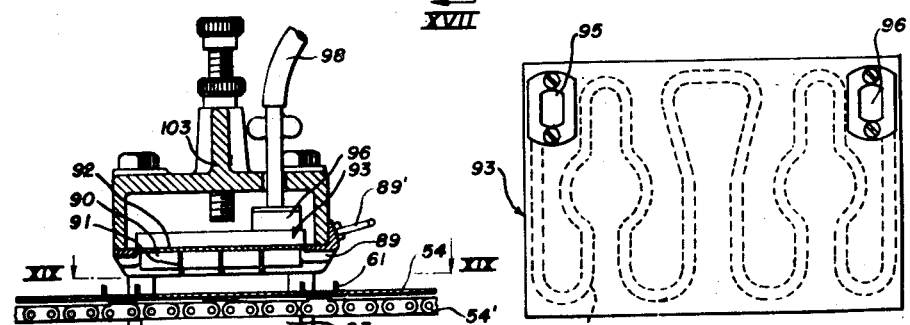
Figure 17 is a sectional view in elevation taken substantially along line XVII—XVII of Figure 16.
Figure 18 is a plan view of the heater plate viewed substantially along line XVIII—XVIII of Figure 16.
Figure 19 is a fragmentary plan view of the slab supporting plate viewed substantially along line XIX—XIX of Figure 17.

Intermittent movement is imparted to the endless chains 54' by means of the forward sprockets 152 having a plurality of circumferentially spaced and latterly projecting trunnions 154, in this instance four, which cooperate with the hooked end 155 of a lever arm 156. The elongated lever 156 is supported proximate to the hooked extremity 155 thereof by a pin 157 which engages a link 158 pivotally supported by a bolt 159 mounted in the extremity 160 of the bracket 146' which supports the shaft 148. The lever 156 is pivotally connected to a crank pin 161 anchored in the crank 162 fixed to the main driving shaft 163 (Figure 16).

This effects the oscillatory movement of the lever 156 which advances the sprocket wheel 152 slightly more than a quarter turn with an intermittent rest period commensurate with the time involved in effecting the return of the lever 156 responsive to the rotation of the crank 162. An axial pin 164 extends from the sprocket 152 to guide the hooked extremity 155 and limiting its upward movement to insure a uniform path of travel backward and forward in accomplishing the intermittent travel of the chain 54'.

It should be noted that when the slab supporting plates 54 reach their end and travel around the sprockets 152—153 (Figure 25), the plates 54 tilt at an angle to clear the nibs 61 on the spacer bars 59 and thus freedom of discharge movement of the slabs 14 with their folded wrappers 15 is accomplished responsive to the intermittent movement of the chain 54'. As the tilting slab supporting plates 54 progress around the forward sprocket 152 in their extreme end displacement, the successive tilting of the plates 54 provides for the discharge of each of the slabs 14, with its paper 15, as will appear more fully hereinafter, on to an oscillating stacker tray 165 having a serrated edge 166 disposed adjacent to the discharge end of the plates 54. The oscillating stacker tray 165 is attached to spaced arms 167, in this instance two, which comprise a part of a tubular transfer sleeve 168. The tubular transfer sleeve 168 is attached to a lever arm 169 which is pivoted as at 170 to an ear 171 of a sleeve 172. The sleeve 172 is reciprocally mounted for sliding movement on a rod 173 having a collar stop 174 adjustably fixed along the extremity of the rod 173.

Another collar 175 is adjustably fixed to the rod 173 on the other side of the sleeve 172 at a distance from the collar stop 174 that is somewhat greater than the length of the sleeve 172. This provides for sufficient play between the sleeve 172 and the rod 173 providing a loose connection which enables the intermittent movement of the stacker tray 165. The rod 173 extends rearwardly to connect with pin 176 provided on a sprocket 177 fixed to the main shaft 163, thereby imparting reciprocal movement to the rod 173 which in turn pivotally oscillates the stacker tray 165 from the lowest position of discharge of the slabs 14 sliding off the inclined supporting plate 54 as it moves over the forward sprocket 152 (Figure 25).

From this extreme position, the wrapped slab 14 is transferred to a supporting table surface 178 for edgewise positioning thereon against stop 179. The stop 179 yields rearwardly to make room for successive slabs 14 as such are vertically stacked on the supporting surface 178 (Figure 25). To this end, the stop plate 179 has a tubular rod 180 anchored thereto as at 181 to serve as a guide therefor.

The tubular rod 180 is telescopically received in and displaced along somewhat larger aligned rod 182 which is fastened to the table supporting surface 178 by means of brackets 183 and 184. Compression spring 185 of a length somewhat greater than the combined extended rods 180—182 is inserted axially therethrough for retention under compression by means of a threaded plug 186 serving to close the free extremity of the larger rod 182. As a result, the successive stacking of the wrapped slabs 14 on the table surface 178 against the stop plate 179, will displace the latter against the action of the spring 185 for retention in position along their top edge by a holder plate 187.

The holder plate 187 is stamped or otherwise shaped to provide a series of perforations 188 to minimize the weight thereof and to enable observation therethrough. The perforated holder plate 187 terminates in the upwardly extending shoulder 190 having a horizontal offset flange 191 to engage the corner 192 of the last vertically stacked and wrapped slab 14. In this position of engagement to maintain the stacked wrapped slabs 14 in a vertical position, the holder plate 187 is normally inclined downwardly for pivotal mounting to a pintle 193 carried by spaced brackets 194. The brackets 194 are permanently attached to upstanding extensions 195 comprising part of bracket arms 196 fixed to a cardboard confining magazine 197 as will appear more fully hereinafter (Figure 25).

The magazine 197 has upstanding front guide posts 198, in this instance two, which are attached to a cross plate 199 having adjustable vertical connection with the upward bracket extensions 195. An elongated bolt 200 extends through the cross plate 199 to engage an upstanding apron 201 comprising a part of the holder plate 187. A threaded engaging nut 202 engages the extremity of the bolt 200 after it projects through the holder plate apron 201 to adjustably limit the extreme downward position of the holder plate 187 and more particularly its corner engaging extremity 190—191 so that the weight of the latter will not rest completely on the vertically stacked slabs 14. This affords the upward tilting of the plate holder 187 in a counter clockwise direction (viewed from Figure 25) as each wrapped slab 14 is transferred by the stacker tray 165 to the supporting table 178.

During this transfer and displacement of the wrapped slabs 14, the holder plate 187 is lifted to permit the transfer of the slab 14 past the holder plate 187 to its vertical position on the supporting surface 178, and thereupon, the corner bracket 190—191 of the holder plate 187 will return to its position of engagement with the corner 192 of the last stacked slab 14 to retain the slabs 14 in stacked relation with the stop plate 179, urging the stacked slabs 14 in the direction of the holder plate corner bracket 190—191. The guide rods 198 with their cross plate 199 serve as a forward retaining wall of the card confining magazine 197 having its sides defined by plates 203 and its rearward end by an angularly upstanding plate 204 comprising part of a bottom plate 205. The bottom plate 205 is attached to a supporting plate 206 having upstanding fasteners such as threaded studs 207 which project through slots 208 provided in the bottom plate 205 for adjustment along the supporting plate 206. This permits the forward and rearward adjustable displacement of the upstanding rearward plate 204.

The magazine 197 is supported by side plates 209 continuing downward from the side walls 203 for engagement with the frame 10. To this end, the supporting plates 209 terminate in brackets 210 anchored to the frame 10 by means of fasteners 211 (Figure 1).

A substantially U-shaped bracket rod 212 is welded or otherwise attached at its upward extremities to inclined card pusher rods 213 disposed along the upper surface of the magazine bottom 206. The lower extremity of the U-shaped bracket rod 212 has a spring plate 214 extending therefrom to provide an upwardly offset arm 215 attached to the forward end of the magazine bottom 206. A cross rod 216 has an eccentric section 217 that contacts the spring plate 214. The cross rod 216 is rotatably supported by spaced side plates 209 serving as a magazine support. Handles 218 are attached to each projecting extremity to raise the pusher rods 213 to correspondingly raise the cards 219 confined in stacked relation in the magazine 197. This elevates the cards 219 above a pair of card feeding tubular sleeves 220 so that there will be no card feeding when there are no slabs 14 being processed as described supra.

The cards serve as dividers and may be of any suitable material such as comparatively rigid cardboard properly treated by waxing or otherwise. The dividers are inserted during the machine stacking of the slabs 14 and prior to packing the stacked wrapped slabs 14 into cartons. The dividers or insert cards 219 are of corresponding size and shape with the wrapped slabs 14, and are supplied for stacked confinement in the magazine 197 in an inclined position corresponding to the bottom 206. The lowermost insert card 219 is displaced from the magazine 197 in timed relation with the placement of the slab 14 on the stacker tray 165. In the present embodiment, an insert or divider card 219 is deposited on the wrapped slab 14 as it leaves the chain plate 54

(Figure 25) and is disposed on the stacker tray 165. Thereupon, the insert or divider card 219 is disposed on the wrapped slab 14 while being displaced to the supporting table surface 178 in vertical edgewise stacked relation.

This is accomplished by means of a feeding mechanism comprising, in this instance, a pair of tubular rods 220 that are telescopically disposed over the guide rods 220' which serve to support the divider or insert cards 219 in stacked relation within the magazine 197. The guide rods 220' are attached to the plate 206 by fasteners 206'. To this end, the telescopic tubular rods 220 terminate at their lower extremity in enlarged sleeves 221. The sleeves 221 have an insert card engaging top shoulder 222 slightly above a rounded forward edge 223 that slides underneath the lowermost insert card 219. This permits the upraised shoulder 222 to engage the edge of the card 219 for displacement downwardly along the lined guide rods 213 and beneath the lower extremities 224 of vertical guide posts 198. The vertical guide posts 198 serve to limit the accidental displacement of the superposed insert cards 219 from the magazine 197. Each of the posts confronts a slightly curved projection 225 formed on the lower extremity of each of the rods 220'. The vertical rods 198 are adjustable to provide for the displacement of individual cards 219 with each stroke of the tubular feed rods 220, depending upon the thickness of the divider cards 219. A cross slot 226 provided in each of the sleeves 221 just ahead of the engaging shoulder 222 communicates with the longitudinal slot 227 to accumulate the excess wax from the cards 219 without clogging and rendering ineffectual the engaging shoulder 222. The tubular rods 220 have bottom slots 227' to permit the displacement of the rods 220 past the fastening spacer bars 227".

The tubular feed rods 220 terminate rearwardly in depending furcated brackets 228 that straddle a cross rod 229 which is attached at its extremities to confronting recessed bosses 230 comprising part of depending levers 231. Levers 231 are pivoted to a shaft 232 (Figures 21 and 25) that extends across the frame 10 to serve as a pivotal support thereof. The levers 231 terminate in arms 233 below the pivot shaft 232 to carry cam followers 234 which are disposed in the path of peripheral cam edges 235 comprising part of the dual purpose cams 147 (Figure 20) fixed to the shaft 148 that is rotated in response to a driving chain meshing with the sprocket 149.

The channels 236 are mounted on the sides of the magazine support 209. Rollers 237 are mounted on the ends of the cross shaft 237' which in turn is attached to the shaft 229 by means of a pair of arms 238. A pusher bar 239 is mounted on the cross-shaft 237' to displace the impressed and segmented slabs 14 from the conveyor plates 54 when they are inclined at the terminal end of their path of travel for placement on the stacker plate 166. It should be noted that the variable connection offered by the furcated brackets 228 with the lever arm shaft 229 compensates for the arcuate path of the lever arms 238 and the substantially straight path of displacement of the tubular rods 220.

It should be noted that the slab centralizer 62 (see page 11 supra) is actuated by a bar 240 (Figures 1, 12 and 24) that is vertically displaced against the lower end of the adjustable stud 72. The actuator bar 240 is vertically guided in a slot (not shown) provided in the frame 10 (Figure 24) to reciprocate as will presently be described. To this end, the lower end of the actuator bar 240 is fixedly and rigidly attached to a link 241 by means of a suitable fastener such as a bolt 242. The rigid link 241 is fixedly connected to another link 243 at their adjacent extremities which have a pivot pin or bolt 244 extending therethrough to retain said links 241—243 in any desired angular rigid relation to determine the extent of vertical displacement of the bar 240. The other end of the link 243 is pivotally anchored as at 245 to a bracket 246 attached to the frame 10 to serve as an anchoring medium therefor. The interconnecting fixed pin or bolt 244 carries a cam follower roller 247 which is disposed in the path of the dual purpose cam 32 for actuating the rigid arm consisting of the links 241—243 and effecting the intermittent vertical reciprocation of the bar 240. The bar 240 has an offset extremity 248 disposed in the path of the depending pin 72 which is adjustable to provide the proper movement to the slab centralizer 62 in timed relation with the passing of each chain plate 54.

The operation of all these instrumentalities in the desired timed relation is accomplished, in this instance, by means of an electric motor 249 which has a built-in gear reducer 250 that is attached to a platform 251 extending between the frame cross-members 13 (Figures 1 and 9). The speed reducer 250 has a driver shaft 252 projecting therefrom to rotate a clutch element 253 in complemental association with a driven clutch element 254. The clutch element 254 is mounted on a driven shaft 255 (Figures 9 and 10) having a sprocket 256 attached thereto for rotation therewith. A bearing bracket 257 supports the shaft 255 for journalled rotation therein, and rotation is imparted to the sprocket 256 by controlling the position of the clutch element 253 relative to its complemental clutch element 254, these being engageable and disengageable through the actuation of the clutch element 253 by a yoke 258. The yoke 258 has trunnions 259 on the confronting arms thereof to engage in an annular groove 260 provided in the periphery of the clutch element 253. The yoke 258 terminates upwardly in an elongated circular boss 261 which is bored to receive a shaft 262 therethrough.

The shaft 262 is supported in bearing brackets 263 and 264 which are spaced for substantially the entire length of the frame 10 to provide for operating levers 265 and 266, in this instance two, at spaced points so that the attendant can control the clutch element 253 which is normally urged to engaging position with the clutch element 254 by a spring 267. The lever 265 is attached to the clutch actuating shaft 262 so that the oscillation of one will cause a corresponding movement with the other and similarly the lever 266 is attached to the shaft 262 so that one or the other of the levers 265—266 can be utilized to connect or disconnect the driven shaft 255 to the driving shaft 252.

In order to maintain the clutch elements 253—254 in connected or disconnected relation, the lever 266 (Figure 11) terminates downwardly in an angularly disposed arm 268 which confronts a cup 269 having a shank 270 extending downwardly therefrom to loosely project through a bearing 271 carried by a stud shaft 272. The bearing stud shaft 272 is journalled for rotation in a bearing bracket 273 which is attached to an end cross-member 13 of the frame 10. A spring 274 envelops the shank 270 to support the cup 269 relative to the bearing 271 and to impart an urge thereto in a vertically upward direction against the lever arm 268.

Consequently, the lever 266 will be held in one or the other of its two extreme positions corresponding to the engagement and disengagement of the clutch elements 253—254. In these two extreme positions of the lever 266, the cup 269 will be shifted to an angular position owing to the permitted rotation of the stud shaft 272 carrying the bearing 271, thereby holding the lever 266 and its angularly offset arm 268 in an off center position through the urge of the spring 274. This action is effected irrespective of whether or not the operating lever 265 or 266 is manipulated and, therefore, the driven sprocket wheel 256 will be controlled by the position of the clutch element 253 relative to the clutch element 254 with the speed reducer driven shaft 252 rotating continuously.

The instrumentalities are driven responsive to the sprocket wheel 256 which has an endless chain 275 in meshing engagement therewith to engage the sprocket 177 fixed to the shaft 163. Another sprocket 276 is fixed to the sprocket 177 through a medium of threaded studs 277 (Figure 16) to rotate with the sprocket 177 and provide corresponding movement to endless chains 275 and 278 in the meshing engagement therewith (Figure 8). The endless chain 278 also extends over a sprocket 279 and under an adjacent sprocket 280 to impart corresponding rotation to a sprocket 281 fixed to the shaft 33 journalled in angularly disposed bearing brackets 34 that depend from the frame 10 (Figure 1).

It should be noted that the sprocket 280 is fixed to the shaft 283 that carries the plate supporting endless chains 54' around the sprockets 152—153. The sprocket 279 is carried by a stub shaft 284 journalled in an angularly disposed bracket 285 fixed to the uprights 12 of the frame 10. Another sprocket 286 is attached to the stub shaft 284 to carry an endless chain 287 around a sprocket wheel 288 carried by the shaft 18 that serves to support the forward roller 17 for the endless feeder belt 16.

The sprocket 276' carried by the shaft 163 has an endless chain 289 extending thereover for meshing engagement with a sprocket 149 carried by the shaft 148 to rotate the dual purpose cams 147—235 and to actuate the paper folder rollers 135—141. An idler sprocket 290 is adjustably mounted in a bracket 291 (Figures 1 and 8) to maintain the endless chain 289 properly tensioned. It should be noted that the sprockets 152 are mounted on a tubular shaft 292 (Figure 23) that is journalled to receive the shaft 164 therethrough which carries the trunnion supporting disc 154'. The solid axial shaft 164 rotates in unison with the tubular exterior shaft 292 so that the trunnions 154 engaged by the hook 155 serve to intermittently rotate the sprockets 152, the endless chains 54', and the slab supporting chain plates 54 and their intermediate spacer plates 59.

The trunnions 154 and their supporting disc 154' are indexed by a lever 293 pivoted to the frame standard 11 (Figure 1) as at 294 to provide a substantially U-shaped hook 295 approximate to the free extremity thereof to be normally disposed in the path of the trunnions 154. A spring 296 engages a bracket 297 formed on the lever 293 so that the other spring extremity may be anchored to the corner frame standard 11 as at 298 to normally urge the indexing hook 295 in a counterclockwise direction (viewed from Figure 1) to successively receive the trunnions 154 therein for exact positioning of the chain plates 54 as they reach the end of their slab supporting position over the forward sprockets 152. With each forward stroke or movement of the trunnion displacing hook 155, its stroke displacement is such to engage the indexing lever bracket 297 to release the indexing hook 295 from a trunnion 154 and permit the engagement of the next successive trunnion to intermittently rotate the sprockets 152 and the chain plates 54.

With the arrangement of the parts above described, it will be apparent that an automatic and continuous impressing and segmenting device has been provided which entails no manual intervention from the time that the slabs 14 are placed on the endless forwarding belt 16 and removed in their vertically stacked position on the opposite table supporting surface 178 where they are deposited after being fully segmented, ornamented, and wrapped.

It should be observed that the pressing and forming of predetermined designs, shapes, or preformed units are not limited to plastic material such as described in the illustrated embodiment. For instance, powder may be supplied between the coacting members for transformation into preformed units of any particular size, design and ornamental appearance.

We claim:

1. In a device of the character described for simultaneously cutting and impressing articles such as flat sheets of plastic material, the combination with endless means for feeding the articles along a predetermined path, of combined cutting and impressing means mounted to confront said feeding means, means for displacing said feeding means relative to said cutting and impressing means while in confronting relation therewith, means for displacing said feeding means along said path to successively locate the articles between said endless feeding means and impressing means, and means for discharging the impressed articles from the predetermined path of said feeding means.

2. In a device of the character described for simultaneously cutting and impressing articles such as flat sheets of plastic material, the combination with means for feeding the articles along a predetermined path, of cutting and impressing means mounted to confront said feeding means, means for intermittently moving said feeding means along said path, means for displacing said feeding means relative to said cutting and impressing means while said feeding means are at rest in confronting relation therewith, means for displacing said feeding means along said path to successively locate the articles between said feeding means and said cutting and impressing means, and means for discharging the impressed articles from the predetermined path of said feeding means.

3. In a device of the character described for simultaneously cutting and impressing articles such as flat sheets of plastic material, the combination with an endless series of independently acting plates defining conveying means for feeding the articles along a predetermined path, of impressing means mounted to confront said feeding means, means for horizontally displacing said conveying means, and means for displacing said endless plate means relative to the impressing means to act on each plate of the articles disposed on said feeding means.

4. In a device of the character described for simultaneously cutting and impressing articles such as flat sheets of plastic material, the combination with an endless series of independently acting plates defining conveying means for feeding the articles along a predetermined path, of impressing means mounted to confront said feeding means, means for displacing said feeding means relative to said impressing means while in confronting relation therewith, and means for displacing said feeding means along said path to successively locate the articles between said endless feeding means and said impressing means.

5. In a device of the character described for simultaneously cutting and impressing articles such as flat sheets of plastic material, the combination with an endless series of independently acting plates defining conveying means for feeding articles along a predetermined path, of impressing means mounted to confront said feeding means, means for displacing said feeding means relative to said impressing means while in confronting relation therewith, means for displacing said feeding means along said path to successively locate the articles between said endless feeding means and said impressing means, and means for discharging the impressed articles from the predetermined path of said feeding means.

6. In a device of the character described for simultaneously cutting and impressing articles such as flat sheets of plastic material, the combination with an endless series of independently acting plates defining conveying means for feeding articles along a predetermined path, of cutting and impressing means mounted to confront said feeding means, means for intermittently moving said plate feeding means along said path and means for displacing said plate feeding means relative to said cutting and impressing means while said plate feeding means are intermittently at rest to act on the articles disposed on said feeding means.

7. In a device of the character described for simultaneously cutting and impressing articles such as flat sheets of plastic material, the combination with an endless series of independently acting plates defining conveying means for feeding the articles disposed on paper sheet liners along a predetermined path, of means for centering the articles in said path, impressing means mounted to confront said feeding means, means for displacing one of said feeding means and impressing means relative to the other to act on the articles disposed on said feeding means, and means for folding the paper sheet liners about the impressed articles while the latter are being displaced along the path for discharge therefrom.

8. In a device of the character described for simultaneously cutting and impressing articles such as flat sheets of plastic material, the combination with an endless series of independently acting plates defining conveying means for feeding the articles disposed on paper sheet liners along a predetermined path, of means for centering the articles in said path, impressing means mounted to confront said feeding means, means for displacing one of said feeding means and impressing means relative to the other to act on the articles disposed on said feeding means, means for folding the paper sheet liners about the impressed articles while the latter are being displaced along the path for discharge therefrom, and means for spraying moisture in the path of said feeding means to humidify the article and paper liner before the folding thereof.

9. In a device of the character described for simultaneously cutting and impressing articles such as flat sheets of plastic material, the combination with an endless series of independently acting plates defining conveying means for feeding the articles disposed on paper sheet liners along a predetermined path, of means for centering the articles in said path, impressing means mounted to confront said feeding means, means for displacing one of said feeding means and impressing means relative to the other to act on the articles disposed on said feeding means, means for folding the paper sheet liners about the impressed articles while the latter are being displaced along the path for discharge therefrom, means for spraying moisture in the path of said feeding means to humidify the article and paper liner before the folding thereof, and means for displacing the impressed and liner wrapped articles from the predetermined path of said feeding means.

10. In a device of the character described for simultaneously cutting and impressing articles such as flat sheets of plastic material, the combination with an endless series of independently acting plates defining conveying means for feeding the articles disposed on paper sheet liners along a predetermined path, of means for centering the articles in said path, impressing means mounted to confront said feeding means, means for displacing one of said feeding means and impressing means relative to the other to act on the articles disposed on said feeding means, means for folding the paper sheet liners about the impressed articles while the latter are being displaced along the path for discharge therefrom, means for spraying moisture in the path of said feeding means to humidify the article and paper liner before the folding thereof, means for stacking said articles and paper liners in alignment, and means for interposing separator cards between successive wrapped articles stacked by said last named means.

11. In a device of the character described for simultaneously cutting and impressing articles such as flat sheets of plastic material, the combination with means for feeding the articles disposed on paper sheet liners along a predetermined path, of means for centering the articles in said path, cutting and impressing means mounted to confront said feeding means, means for intermittently moving said feeding means along said path, means for displacing said feeding and cutting-impressing means relative to each other while said feeding means are intermittently at rest to act on the articles disposed on said feeding means, and means for folding the paper sheet liners about the impressed articles while the latter are being displaced along the path for discharge therefrom.

12. In a device of the character described for simultaneously cutting and impressing articles such as flat sheets of plastic material, the combination with means for feeding the articles disposed on paper sheet liners along a predetermined path, of means for centering the articles in said path, cutting and impressing means mounted to confront said feeding means, means for intermittently moving said feeding means along said path, means for displacing said feeding and cutting-impressing means relative to each other while said feeding means are intermittently at rest to act on the articles disposed on said feeding means, means for folding the paper sheet liners about the impressed articles while the latter are being displaced along the path for discharge therefrom, and means for displacing the impressed and liner wrapped articles from the predetermined path of said feeding means.

13. In a device of the character described for simultaneously cutting and impressing articles such as flat sheets of plastic material, the combination with means for feeding the articles disposed on paper sheet liners along a predetermined path, of means for centering the articles in said path, cutting and impressing means mounted to confront said feeding means, means for intermittently moving said feeding means along said path, means for displacing said feeding and cutting-impressing means relative to each other while said feeding means are intermittently at rest to act on the articles disposed on said feeding means, means for folding the paper sheet liners about the impressed articles while the latter are being displaced along the path for discharge therefrom, and means for discharging the impressed and liner wrapped articles from the predetermined path of said feeding means.

14. In a device of the character described for simultaneously cutting and impressing articles such as flat sheets of plastic material, the combination with means for feeding the articles disposed on paper sheet liners along a predetermined path, of means for centering the articles in said path, cutting and impressing means mounted to confront said feeding means, means for intermittently moving said feeding means along said path, means for displacing said feeding and cutting-impressing means relative to each other while said feeding means are intermittently at rest to act on the articles disposed on said feeding means, means for folding the paper sheet liners about the impressed articles while the latter are being displaced along the path for discharge therefrom, means for discharging the impressed and liner wrapped articles from the predetermined path of said feeding means, and means for interposing separator cards between successive wrapped articles stacked by said last named means.

15. In a device of the character described, the combination with endless means to feed articles along a predetermined path, of an endless series of independent plates defining conveying means adjacent said first named endless means to receive articles therefrom, means for moving said conveying means with articles on said plates, impressing means in confronting relation with said last named conveying means, means to displace said plates and impressing means relative to each other, and means for indexing the movement of said first named endless means with said endless series of independent plates to transfer the articles from the former consecutively on the plates.

CHARLES DOERING.
HENRY H. DOERING.
BERTIL J. SKOGLUND.
ERIC W. ANDERSON.

REFERENCES CITED

The following references are of record in the file of this patent:

UNITED STATES PATENTS

| Number | Name | Date |
|---|---|---|
| 126,641 | Mabbitt | May 14, 1872 |
| 162,257 | Starks | Apr. 20, 1875 |
| 541,642 | Traiser | June 25, 1895 |
| 760,827 | Vicars et al. | May 24, 1904 |
| 814,486 | Vicars et al. | Mar. 6, 1906 |
| 1,456,174 | Beam | May 22, 1923 |
| 1,481,304 | Sharp et al. | Jan. 22, 1924 |
| 1,601,156 | Adelmann | Sept. 28, 1926 |
| 1,653,402 | Kaser | Dec. 20, 1927 |
| 1,899,595 | Snyder et al. | Feb. 28, 1933 |
| 2,141,226 | Rubel et al. | Dec. 27, 1938 |
| 2,201,872 | Rottenberg | May 21, 1940 |
| 2,312,511 | Weinberg | Mar. 2, 1943 |

FOREIGN PATENTS

| Number | Country | Date |
|---|---|---|
| 162,031 | Germany | July 22, 1905 |
| 511,152 | Germany | Oct. 27, 1930 |
| 648,488 | France | Aug. 14, 1928 |
| 10,063 | Great Britain | 1909 |
| 16,789 | Great Britain | 1898 |